United States Patent
Broadworth

(10) Patent No.: US 10,069,968 B2
(45) Date of Patent: Sep. 4, 2018

(54) AUTOMATIC NUMBER IDENTIFICATION VALIDATION IN A COLLABORATION CONFERENCE SYSTEM

(71) Applicant: Level 3 Communications, LLC, Broomfield, CO (US)

(72) Inventor: Andrew J. Broadworth, Thornton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 15/414,381

(22) Filed: Jan. 24, 2017

(65) Prior Publication Data

US 2018/0124237 A1    May 3, 2018

Related U.S. Application Data

(60) Provisional application No. 62/417,204, filed on Nov. 3, 2016.

(51) Int. Cl.
*H04M 3/56* (2006.01)
*H04M 3/42* (2006.01)

(52) U.S. Cl.
CPC ......... *H04M 3/42068* (2013.01); *H04M 3/56* (2013.01); *H04M 2203/558* (2013.01); *H04M 2203/6045* (2013.01); *H04M 2203/6072* (2013.01)

(58) Field of Classification Search
CPC ........... H04M 3/56; H04M 2203/5009; H04M 2203/5045; H04M 2203/5054; H04M 3/42025; H04M 3/42059; H04M 3/42068

USPC ............ 379/205.01, 202.01, 142.01, 142.06, 379/211.01, 142.04, 142.05, 207.15
See application file for complete search history.

(56) References Cited

U.S. PATENT DOCUMENTS

| | | | |
|---|---|---|---|
| 9,013,538 B2* | 4/2015 | Ellison | H04L 65/403 348/14.08 |
| 2002/0146103 A1* | 10/2002 | Holt | H04M 3/38 379/211.02 |
| 2006/0182234 A1 | 8/2006 | Scherer | |

(Continued)

OTHER PUBLICATIONS

International Search Report dated Apr. 18, 2017, Int'l Appl. No. PCT/US17/014751, Int'l Filing Date Jan. 24, 2017; 3 pgs.

(Continued)

*Primary Examiner* — Thjuan K Addy

(57) ABSTRACT

Systems, methods, computer program products, and the like, are provided herein for collaboration conferencing with multiple participants over a communications network, and more specifically for utilizing a received Automatic Number Identification (ANI) value to validate an identification of a user of the collaboration system. In general, the ANI is a value associated with a telephone call or other communication of a telecommunications network that identifies the originating telephone number. For example, a telephone call placed from a communication device (such as a telephone at a person's home) may include the telephone number associated with the communication device, such as the ten-digit telephone number of the device. The ANI value may be obtained by one or more networking devices to determine the originating device or number of the communication.

19 Claims, 5 Drawing Sheets

(56) References Cited

U.S. PATENT DOCUMENTS

2010/0098230 A1* 4/2010 Bhow ................. H04L 12/1818
                                                    379/202.01
2013/0336170 A1  12/2013 Broadworth et al.
2016/0301653 A1  10/2016 Kirchhoff
2017/0078338 A1*  3/2017 Arora ................... H04L 65/403

OTHER PUBLICATIONS

Written Opinion of the International Searching Authority dated Apr. 18, 2017, Int'l Appl. No. PCT/US17/014751, Int'l Filing Date Jan. 24, 2017; 5 pgs.

* cited by examiner

AUTOMATIC NUMBER IDENTIFICATION VALIDATION IN A COLLABORATION CONFERENCE SYSTEM

CROSS-REFERENCE TO RELATED APPLICATIONS

This application is related to and claims priority under 35 U.S.C. § 119(e) from U.S. Patent Application No. 62/417,204, filed Nov. 3, 2016, titled "AUTOMATIC NUMBER IDENTIFICATION VALIDATION IN A COLLABORATION CONFERENCE SYSTEM," the entire content of which is incorporated herein by reference for all purposes.

TECHNICAL FIELD

Aspects of the present disclosure generally relate to systems and methods that provide for collaboration conferencing with multiple participants using devices connected to a telecommunication network, including a VoIP network, and more specifically for utilizing a received Automatic Number Identification (ANI) value to validate an identification of a user of the collaboration system.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from a few users to several hundred users communicating on the same telephonic and/or data call.

Typically, conferencing communications require participants to the conference to place a telephonic call to a dedicated conferencing number. Some networks also require the participants to enter a conference call access code into the keypad of a telephonic device. The conferencing number and access code are then utilized by the telecommunications network to connect that participant to a conferencing bridge device. In still other embodiments, the conferencing bridge may request a second identification code that indicates the participant is a chairperson for the conference. In general, a conferencing bridge is a telecommunications device that hosts the participants of a conferencing communication such that the participants can attend the collaboration. Thus, the network typically receives the dialed number and conference code from each participant and connects the participant to the conferencing bridge. Once connected to the conference bridge, the participant may take part in the conferencing communication. A chairperson to the collaboration conference may have certain additional features for the conference, such as the ability to mute participants, hang-up on participants, or to control aspects of an associated web conference.

SUMMARY

One implementation of the present disclosure may take the form of a telecommunications network. The telecommunications network may include a plurality of conference bridges and at least one routing device. The at least one routing device may be configured to receive one or more device identifiers from a subscriber to a collaboration conferencing system, store the one or more device identifiers in a database, receive a request to access the collaboration conferencing system, the request comprising an Automatic Number Identification (ANI) value associated with an originating communication device of the subscriber to the collaboration conferencing system, and assign a particular status to a requester to a collaboration conference based at least on the ANI value from the request matching at least one of the one or more device identifiers in a database.

Another implementation of the present disclosure may take the form of method for operating a collaboration conferencing system of a telecommunications network. The method may include the operations of receiving one or more device identifiers from a subscriber to a collaboration conferencing system, associating the one or more device identifiers with a particular customer account number of the collaboration conferencing system, and storing the one or more device identifiers with the particular customer account number in a database. The method may further include receiving a request to access the collaboration conferencing system, the request comprising an Automatic Number Identification (ANI) value associated with an originating communication device of the subscriber to the collaboration conferencing system, comparing the received ANI value to the stored one or more device identifiers in the database, and assigning a particular status to a requester to a collaboration conference based at least on the ANI value from the request matching at least one of the one or more device identifiers in a database.

Yet another implementation of the present disclosure may take the form of a networking device. The networking device may include at least one communication port for receiving a request to access a collaboration conferencing system of a telecommunications network, the request comprising an Automatic Number Identification (ANI) value associated with an originating communication device of a subscriber to a collaboration conferencing system, a processing device, and a computer-readable medium connected to the processing device configured to store information and instructions. When the instructions are executed by the processing device, the networking device performs the operations of accessing a database comprising one or more device identifiers associated with a particular customer account number of the collaboration conferencing system, wherein the subscriber is associated with the particular customer account number, comparing the received ANI value to the stored one or more device identifiers in the database, and assigning a particular status to a requester to a collaboration conference based at least on the ANI value from the request matching at least one of the one or more device identifiers in a database.

DETAILED DESCRIPTION

Figure 1:
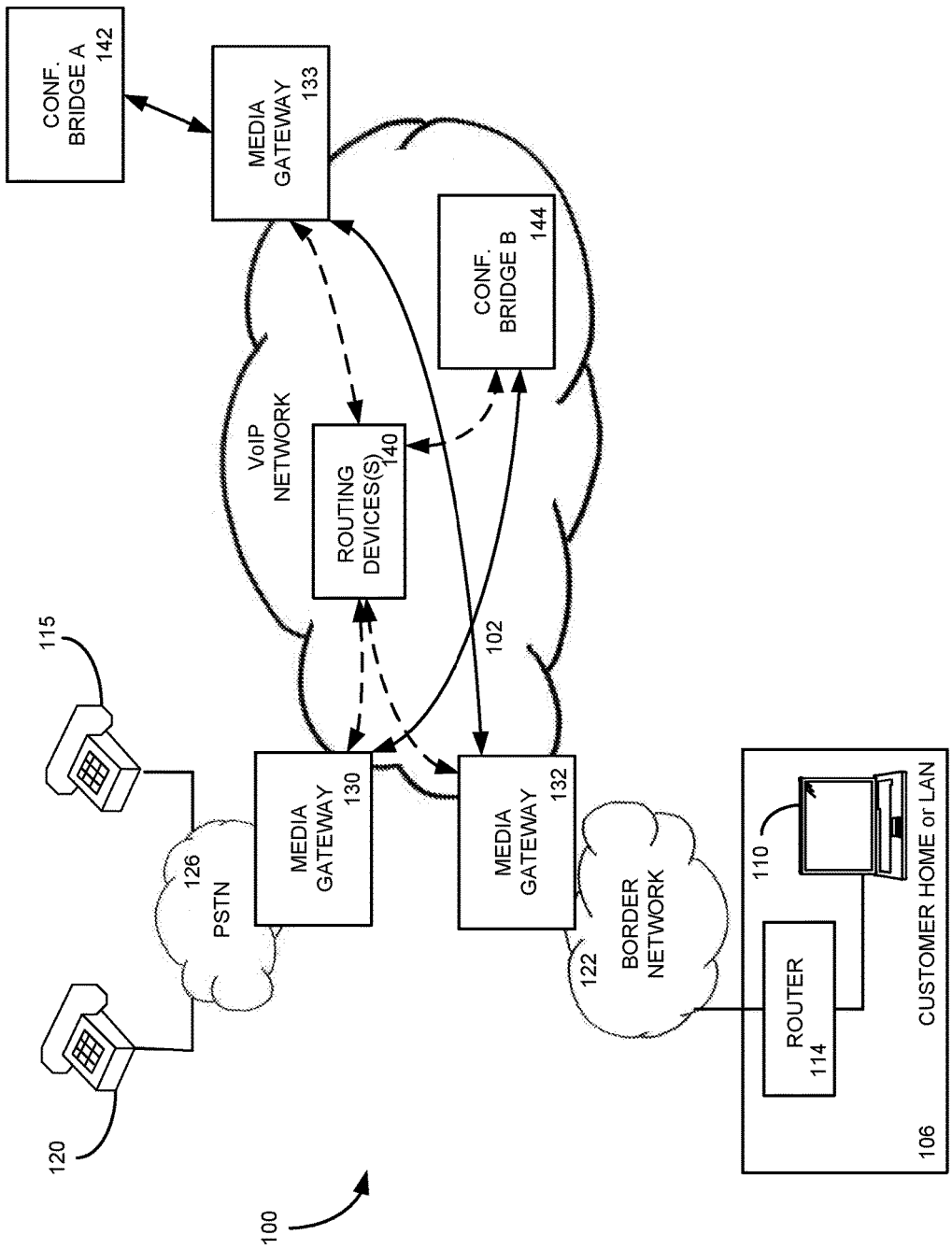
FIG. 1 schematic diagram illustrating an exemplary Voice over Internet Protocol (VoIP) operating environment, including a central conferencing routing server, in accordance with one embodiment.

Aspects of the present disclosure involve systems, methods, computer program products, and the like, for collaboration conferencing with multiple participants over a communications network, and more specifically for utilizing a received Automatic Number Identification (ANI) value to validate an identification of a user of the collaboration system. In general, the ANI is a value associated with a telephone call or other communication of a telecommunications network that identifies the originating telephone number. For example, a telephone call placed from a communication device (such as a telephone at a person's home) may include the telephone number associated with the communication device, such as the ten-digit telephone number of the device. The ANI value may be obtained by one or more networking devices to determine the originating device or number of the communication.

In one particular embodiment, a collaboration conferencing system may obtain or extract the ANI value from a communication requesting access of a collaboration conferencing system. With the ANI value obtained, the system may automatically identify the caller originating the communication as a chairperson or other status of an initiated collaboration conference. In other words, the system may utilize the ANI as the originator's passcode to establish the caller as the conference chairperson (or any other status available for the collaboration conference). The use of the ANI to identify a party to the conference may simplify the call flow for accessing or initiating a collaboration conference, as well as providing an added layer of security for potential fraudulent uses of the collaboration conferencing system.

To utilize the ANI for identification of a user of the collaboration conferencing system, the system may first receive one or more telephone numbers associated with devices of a user of the system. In one example, the user may provide a plurality of telephone numbers to the system associated with communication devices used by the user. The telephone numbers are then stored by the system for later identification with the user. When the user accesses or initiates a collaboration conference managed by the system, the system may obtain an ANI value from a received communication from the user. Further, the system may compare the obtained ANI of the user to the stored telephone numbers for that user by accessing the database of telephone numbers. If the obtained ANI matches a stored telephone number for the user, the system may assign a particular status to the user, such as a chairperson or leader of a collaboration conference. This automatic assigning of the status based on the ANI may simplify the call flow for accessing the conference as a prompt to the user for the user's passcode may be removed by the system.

Further, in some instances a user of the collaboration conference may attempt to fraudulently access the collaboration conferencing system to which the user is not a subscriber. In particular, the fraudulent user may provide a valid access number and access code to obtain use of the system. However, the user may not be a subscriber such that the user cannot be a chairperson or leader of the collaboration conference. In such instances, the fraudulent user may attempt to guess a subscriber's passcode or personal identification number (PIN) to obtain chairperson status for a conference. Removing the prompt to the caller to enter an identifying passcode by utilizing the ANI value instead makes it more difficult for the fraudulent user to guess a valid subscriber's PIN and gain access to the system. Other advantages, including improvement to the operation of a telecommunications and collaboration conferencing system, may also be realized through the methods and systems described herein.

FIG. 1 illustrates an exemplary operating environment 100 for hosting conference collaboration communications between multiple participants. The environment 100 provides for establishing communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that portions of the network 102 may include non IP-based routing. For example, network 102 may include devices utilizing time division multiplexing (TDM) or plain old telephone service (POTS) switching. In general, the network 102 of FIG. 1 may include any communication network devices known or hereafter developed.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home- or business-based, but they can be relocated and may be designed for easy portability. For example, the communication device 110 may be wireless (e.g., cellular) telephone, smart phone, tablet or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference, although any type of collaboration conference over a telecommunications network is envisioned with respect to the present disclosure. Similarly, although FIG. 1 illustrates some of the communication devices 115, 120 as telephonic devices, the communication devices may be any type of communication device, including personal computers, cellular phones and the like.

Upon receipt of the request for a collaboration conference, the network 102 routes the request to a routing device 140 or routing devices integrated within the network 102. However, it should be appreciated that the routing device 140 may be a part of the network 102, may be separate from the network, or may have portions deployed in the network and out of the network. In addition, the routing device 140 may be resident on one or more components of the VoIP network 140, including several instances of the routing device 140 integrated throughout the network 140. Further, although only a single instance of a routing device 140 is illustrated in FIG. 1, any number of routing devices may be present in the network 102. In one particular embodiment, the routing device 140 is referred to as a Collaboration Conferencing Routing Server (CCRS).

To transmit the request to the network, the requester uses the communication device 110, 115, 120 to enter a conference specific telephone number or access port. The routing device 140 receives the request to begin a collaboration conference or join an existing conference. In response, and described in more detail below, the routing device 140 may route the one or more requests to one of several conference bridges 142, 144 associated with the VoIP network 102 for hosting of the collaboration conference. Although only two conference bridges 142, 144 are shown in FIG. 1, it should be appreciated that any number of conference bridges may be associated with the network 102 for hosting collaboration conferences.

In general, the conference bridges 142, 144 provide a hosting site for a collaboration conference between a plurality of users of the network 102. Thus, conference bridge A 142 may host a collaboration conference while conference bridge B 144 may host an additional collaboration conference. In particular, conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the VoIP network 102 through which the communications of the conference are transmitted. This configuration is utilized for Internet Protocol (IP) based bridges and is generally described in more detail below.

One particular network and/or conference bridge platform supported by the network configuration 102 of FIG. 1 is a Session Initiation Protocol (SIP) based network. For example, conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based CCRS devices may utilize many of the advantages of information exchange within the header when communicating with TDM-based network devices.

To connect to a collaboration conference, each participant to the conference may be routed to the same conference bridge 144 for the duration of the conference. The conference bridge 144, in turn, provides communication ports for each participant such that each participant can hear or otherwise participate in the collaboration conference. Any conference bridge known in the art or hereafter developed may be integrated into the system 100 of FIG. 1 for hosting a collaboration conference, including IP-based conference bridges. In addition, the term "conference bridge" or "bridge" includes any component of a communication network that provides an access point to one or more users of the network for a collaboration conference. For example, "conference bridge" may also include such devices as a media server device, a gateway server device or the like as configured within the network 102.

In some instances, the conference bridge 144 or routing device 140, upon receipt of the request to initiate or join a collaboration conference, executes an application that queries the requester to enter an access code number that the requester enters into the communication device 110, 115, 120. With this information, the network 102 determines that the requester intends to initiate or join a collaboration conference and routes the request to a conference bridge, as explained in greater detail below. Thus, each participant to the collaboration conference may provide the same access code to the routing device 140 to be routed to the same bridge to attend the collaboration conference. Further, in some networks, the conferencing bridge 142, 144 may request additional information from a caller to the bridge to identify the participant as the chairperson. In a similar manner as described above, the chairperson may provide the information to the bridge 142, 144 through the communication device 110, 115, 120 to identify the participant as the chairperson. The chairperson of the collaboration conference is generally given access to additional features of the collaboration conference, such as the ability to mute participants, share certain features with participants, disconnect the conference, etc.

Figure 2:
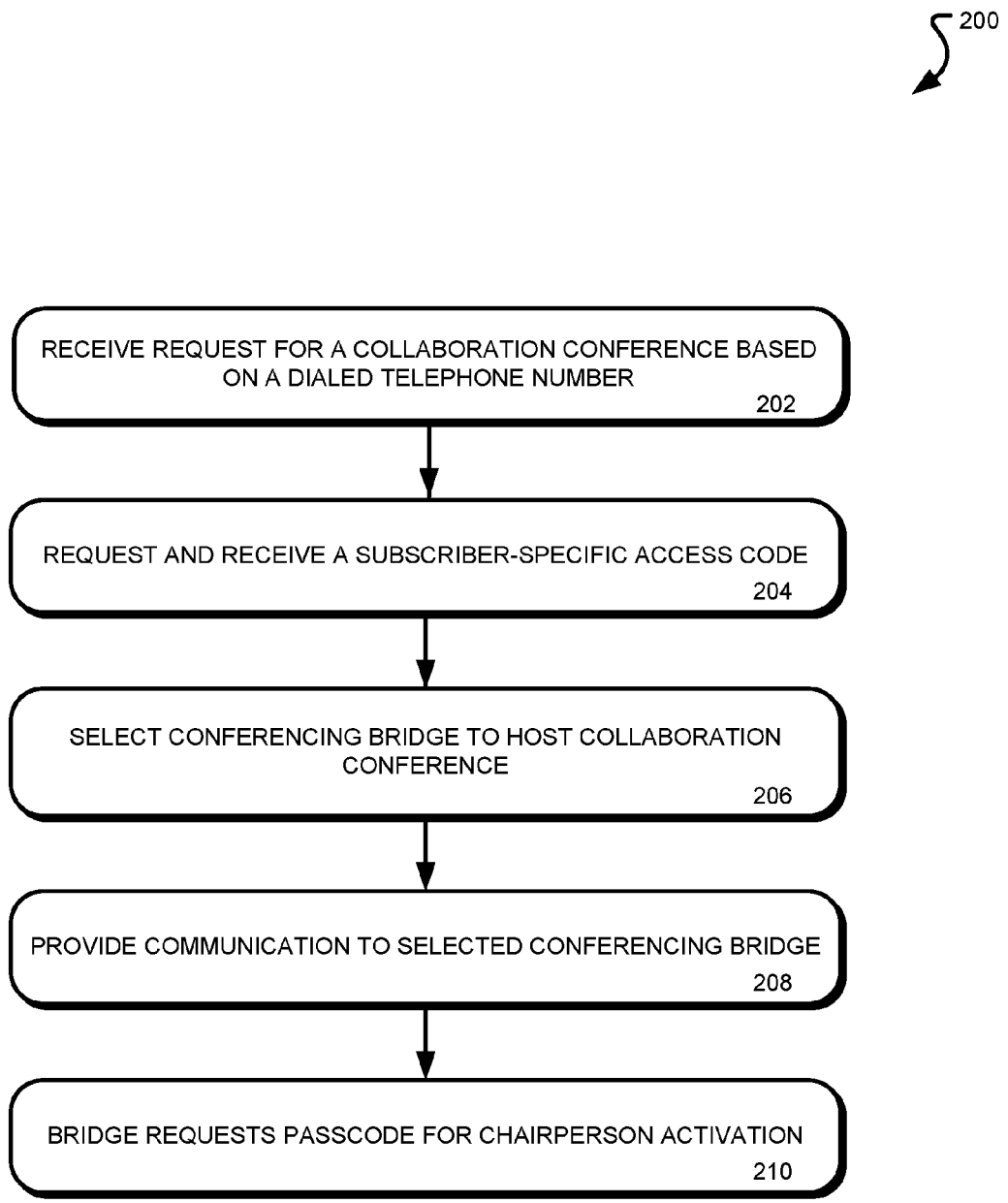
FIG. 2 is a flowchart of a typical method for connecting a participant to a collaboration conferencing system.

As described above, the collaboration conferencing system may request certain information through a communication device to connect a participant to a collaboration conference hosted on a conferencing bridge. In general, this information is provided through the keypad of the communication device. For example, FIG. 2 is a flowchart of a typical method 200 for connecting a participant to a collaboration conferencing system. Through the operations of the method 200 of FIG. 2, the collaboration conferencing system may connect a participant to a particular conference and/or determine a particular participant as a chairperson or other status of the collaboration. Thus, in one embodiment, the operations of the method 200 are performed by a routing device 140 or conferencing bridge 142, 144 of a collaboration conferencing system.

Beginning in operation 202, the routing device 140 receives a communication from a user of the network. The communication is delivered to the routing device 140 based on the telephone number the user dials into the communication device (referred to as the "access number"). The routing device 140, upon receiving the communication, determines that the user intends to initiate or join a collaboration conference based on the dialed number. In response, the routing device 140 obtains one or more messages from a database (based on the dialed telephone number) and plays the messages to the caller in operation 204. In one particular implementation, the messages request the user to provide an access code to the routing device 140 through the communication device keypad to verify a particular conference of the system. The access code may indicate an existing collaboration conference already hosted on a conferencing bridge 144, or may indicate a new collaboration conference to the system.

In operation 206, the routing device 140 selects a conferencing bridge 144 to host the collaboration conference indicated by the access code. In particular, the routing device 140 utilizes the access number and access code to reference an entry in a database to determine if a collaboration conference is already initiated with the access number and access code combination. If a collaboration conference is already initiated or being hosted on a conferencing bridge 144, the user is routed to the hosting bridge to join the conference. Alternatively, if the collaboration conference has not been initiated, the routing device 140 selects a conferencing bridge 144 to host the collaboration conference and routes the communication to the selected bridge in operation 208.

The selected conferencing bridge 144 may further request information from the participant. For example, the conferencing bridge 144 may play additional messages to the participant to request information, such as a passcode or PIN, from the user. The passcode may be utilized to determine a status of the participant. For example, the participant may be given a passcode as a subscriber to the collaboration conferencing system. This passcode may identify the user to the collaboration conferencing system, providing the user with certain status or privileges. In one example, the passcode identifies the user as a chairperson to the collaboration conference, allowing the user to control or lead the conference. However, the passcode may be used by the conferencing bridge for any reason. In some instances, the passcode is a four-digit number that is provided by the user through the keypad of the communication device. The conferencing bridge than compares the received passcode to a database of users of the system (in some instances identifiable through the access code provided) to determine if the user is a subscriber to the system.

Through the method 200 described above, the user provides both an access code and a passcode to the collaboration conferencing system to be identified or obtain chairperson status with the system. However, this process includes the user providing two sets of identifying information to the system through the keypad of the communication device, complicating the call flow for accessing a conference as a chairperson. Further, in some instances, a fraudulent user may provide a valid access number and access code to the system. Once connected to a bridge, the user may attempt to guess a user's PIN or passcode through the communication device to gain chairperson access without being a subscriber to the system.

Figure 3A:
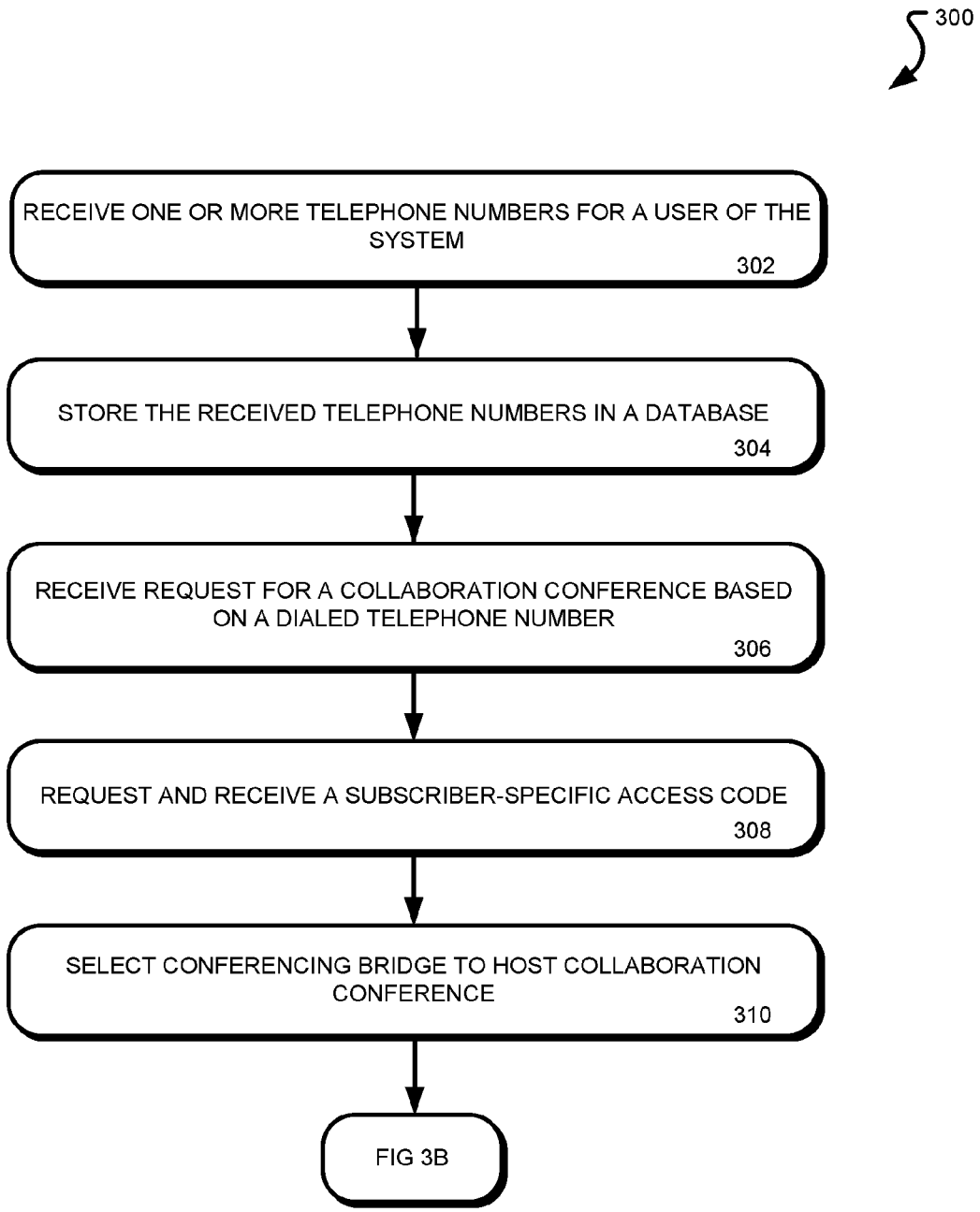
FIGS. 3A and 3B are a flowchart of a method for utilizing an automatic number identification to validate a user of a collaboration conferencing system.
Figure 3B:
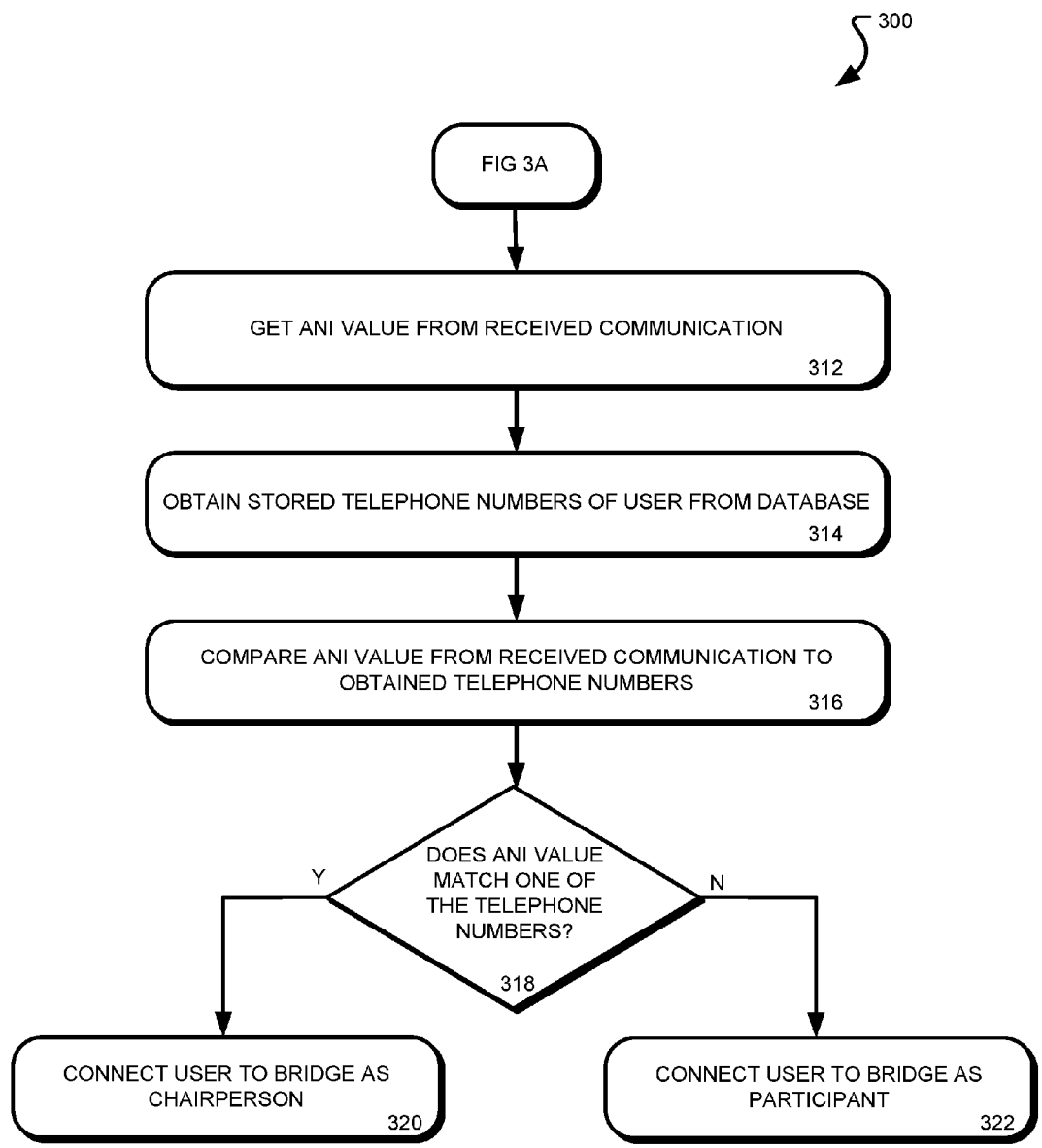

In another embodiment, a user's ANI value of the communication device used to access the collaboration conferencing system may be utilized to identify the user as a chairperson (or other status) of the conference. In particular, FIGS. 3A and 3B are a flowchart of a method 300 for utilizing an ANI value of a received communication to validate or identify to a user of a collaboration conferencing system. In general, the operations of the method 300 may be performed by a routing device 140 of the collaboration conference system, such as a CCRS device. In other implementations, the operations are performed by a plurality of telecommunication devices of the telecommunication network 102.

Beginning in operation 302, the routing device 140 receives one or more telephone numbers associated with communication devices of a user of the system. For example, a subscriber to a collaboration conferencing system or the telecommunications network 102 may provide the telephone numbers for the user's communication devices connected to the network. For a customer to the collaboration conferencing system that includes multiple users (such as a corporation), a telephone number for each communication device associated with the customer account may be provided. For individual users, a home telephone number, a work telephone number, a cellular or other mobile telephone number, etc., may be provided to the system. In general, any telephone number of any communication device associated with a telecommunications network may be provided or obtained by the routing device 140.

In operation 304, the routing device 140 stores the received telephone numbers in a database. In particular, the routing device 140 may store the received telephone numbers for a particular user associated with an identifier of the user. Thus, the stored telephone numbers are associated with the particular user in the database. In one particular embodiment, the user telephone numbers are associated with an account number that is identifiable through a provided access code. In this manner, when a user provides an access code to the collaboration conferencing system, the system may utilize the access code to determine an account number that allows the system to obtain the stored telephone numbers from the database.

At some later time after the telephone numbers associated with a user are stored in the database, the routing device 140 receives a request from the user to join or initiate a collaboration conference, as described above. The user is connected to the routing device 140 based on the access number that user dials on one of the communication devices of the user. In one particular instance, the dialed access number includes an ANI value that identifies the telephone number of the originating communication device used by the user to dial the routing device 140. The ANI value may be included in header information or some other component of the communication from the routing device 140. As also described above, the routing device 140 may request and receive a subscriber-specific access code from the user in operation 308 and select a conferencing bridge to host the collaboration conference in operation 310. The user, upon receiving a request for the access code from the routing device 140, may provide the access code to the routing device through a keypad of the communication device. With the dialed access number and the provided access code, the routing device 140 verifies that an account exists associated with the number and code and selects a bridge to host the conference.

Continuing to FIG. 3B, the routing device 140 may obtain an ANI value from the received communication from the requesting device in operation 312. In particular, the request received at the routing device 140 may include an ANI value that identifies the originating communication device used to originate the request. For example, the ANI value may be a telephone number associated with the originating communication device. In one embodiment, the ANI value is included in a header or other signaling information associated with the request to join the collaboration conference. Thus, in addition to the dialed telephone number, the telephone number of the originating device may also be included in the request. In other embodiments of the present disclosure, the ANI value may be any value or string of bits that identifies the originating communication device.

In operation 314, the routing device 140 obtains one or more stored telephone numbers associated with the user from the database. As explained above, the user of the collaboration conferencing system may provide telephone numbers associated with the user that the user may use to access or call the collaboration conferencing system. The user telephone numbers may be stored in the database as associated or a member of a customer account to the collaboration conferencing system. Thus, through the received access number and access code, the routing device 140 may determine an account of the collaboration conferencing system that includes the user. With the account information or identification, the routing device 140 may then obtain the stored telephone numbers associated with the user based on the account information. Further, in operation 316, the routing device 140 compares the ANI value obtained from the request to the telephone numbers stored in the database for the particular account of the user. In other words, the routing device 140 compares the ANI value with the stored telephone numbers to determine if the originator of the request to the collaboration conferencing system is calling from a known communication device.

In operation 318, the routing device 140 determines if the ANI value matches one of the stored telephone numbers. If the ANI value does not match one of the stored telephone numbers, the routing device 140 then connects the requester to the selected conferencing bridge as a participant to the collaboration conference hosted by the bridge in operation 322. In other words, the routing device 140 determines that the communication device used to provide the request to join a collaboration conference does not belong to a customer or user associated with the account number used to access the system. Thus, the requester may be a participant to the collaboration conference and not a chairperson to the conference. In one particular embodiment, the routing device 140 may direct the request to the selected conferencing bridge with a suggested status for the request. In this example, the suggested status of the request to join the conference is a participant to the conference based at least on that the received ANI value in the request does not match the stored telephone numbers for the account or is otherwise unrecognized by the collaboration conferencing system.

In contrast, the obtained ANI value may match one of the telephone numbers obtained from the database. In such cases, the routing device 140 may route the request to the selected conferencing bridge with a status of the requester as a chairperson for the collaboration conference in operation 320. In other words, rather than request a passcode or PIN from a user to the collaboration conference to grant the user a chairperson status, the system may identify the requester as a subscriber to the conferencing system based on the ANI value and assign the chairperson status to that requester when connecting the requester to the conference. In particular, the routing device 140 may provide a suggested status for the requester when being redirected to the selected conferencing bridge hosting the collaboration conference. In this manner, the requester's status as the chairperson (or any other status of the collaboration) is assigned based on the ANI value provided in the request to join the collaboration conferencing system.

Through the systems and method 300 described above, a requesting device's ANI value may be used by a collaboration conferencing system to identify the requester as a customer or subscriber to the system. The collaboration conferencing system may, in turn, establish one or more statuses upon the requester based on the identification of the subscriber's communication device. For example, the collaboration conferencing system may receive an ANI value associated with a subscriber's communication device in a request and make the requester the chairperson for a collaboration conference. Other statuses may also be set based on the ANI value included in the request received at the system. Further, the method 300 allows for subscribers to provide multiple telephone numbers or identifiers to the system. Thus, the user may be identified by the system for any number of communication devices utilized by the user.

Several advantages may be obtained by a telecommunications network 102 utilizing the systems and methods described herein. For example, by utilizing an ANI value associated with a communication received from a requesting device to identify a subscriber to the system and setting that subscriber as the chairperson for the conference, the call flow for establishing the conference is simplified. In particular, the routing device 140 or conferencing bridge 144 do not need to play a message to request the user provide a passcode or PIN given to the subscriber to identify the user as a chairperson. The removal of this exchange of information simplifies the call flow to establish the conference. In some instances, the first requester to a collaboration conference that is identified as a subscriber based on the ANI of the request is established by the system as the chairperson, even though other subscribers may join the collaboration conference at a later time.

Mechanisms may also be provided that allow for other participants to be chosen as the chairperson of the collaboration conference. For example, rather than automatically assigning the chairperson to the identified requester based on ANI value, the conferencing bridge may allow another participant to claim chairperson status by manually providing a bypass code through the keypad of the communication device and a recognized passcode. In some instances, the bypass code may be provided to subscribers of the collaboration conferencing system to prevent unauthorized access of the system as a chairperson.

In addition to simplifying or reducing the call flow to establish a collaboration conference, the systems and methods described herein may increase the security of the collaboration conferencing system. For example, a fraudulent user to the system may obtain or know an access number and access code to use the collaboration conferencing system. However, because the fraudulent user is not a subscriber to the system, the user would not have a passcode or PIN to act as a chairperson for a particular conference. Under previous systems, the fraudulent user may attempt to guess a valid user's passcode by entering it through the communication device keypad. When a proper PIN is guessed by the fraudulent user, the user may have chairperson access to the communication system. However, by using a registered ANI value to identify requesters to the system, subscribers of the system are automatically identified and no PIN needs to be provided to be the chairperson. In this manner, the ability of a user to guess at a subscriber passcode to access the system is removed, providing a more secure collaboration conferencing system.

Figure 4:
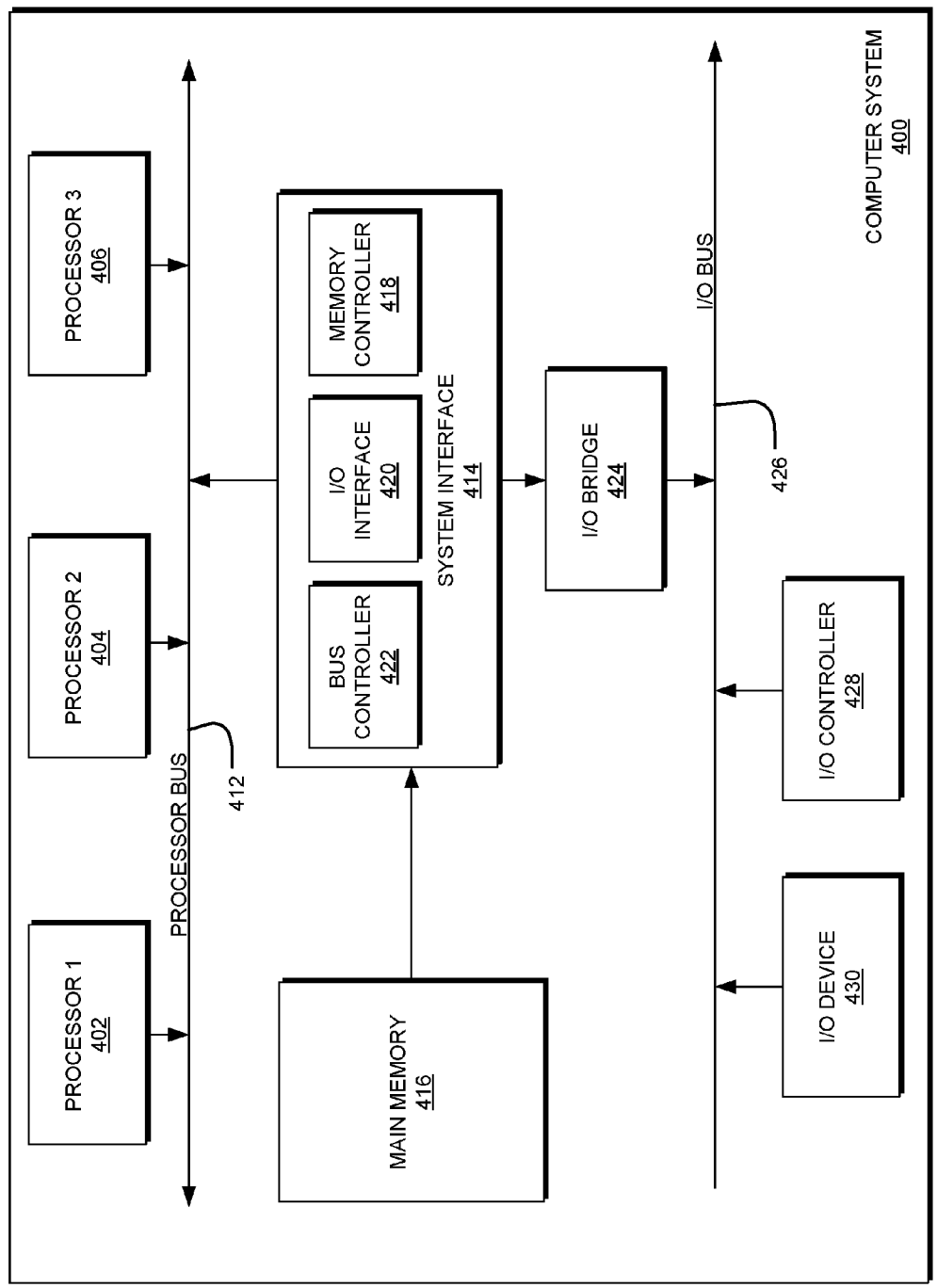
FIG. 4 is a diagram illustrating an example of a computing system which may be used in implementing embodiments of the present disclosure.

FIG. 4 is a block diagram illustrating an example of a computing device or computer system 400 which may be used in implementing embodiments of the present invention. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. Processors 402-406 may also be purpose built for processing/mixing media data, such as audio or video components of a media stream, such as a digital switch processor. System interface 414 may be connected to the processor bus 412 to interface other components of the system 400 with the processor bus 412. For example, system interface 414 may include a memory controller 416 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A telecommunications network comprising:
a plurality of conference bridges; and at least one routing device configured to: receive one or more device identifiers from a subscriber to a collaboration conferencing system;
store the one or more device identifiers in a database; receive a request to access the collaboration conferencing system, the request comprising an Automatic Number Identification (ANI) value associated with an originating communication device of the subscriber to the collaboration conferencing system; and
assign a chairperson status to a requester to a collaboration conference based at least on the ANI value from the request matching at least one of the one or more device identifiers in a database, wherein the chairperson status provides additional features for the collaboration conference as compared to a participant status in the collaboration conference.

2. The telecommunications network of claim 1 wherein each of the one or more device identifiers received from the subscriber is associated with a communication device associated with the subscriber and in communication with the collaboration conferencing system.

3. The telecommunications network of claim 1 wherein storing the one or more device identifiers in the database comprises associating the one or more device identifiers with a particular customer account number of the subscriber to the collaboration conferencing system.

4. The telecommunications network of claim 3 wherein the at least one routing device is further configured to transmit a request for an access code and receiving the access code on the originating communication device.

5. The telecommunications network of claim 4 wherein the at least one routing device is further configured to associate a dialed collaboration conferencing telephone number and the access code with the particular customer account number of the collaboration conferencing system.

6. The telecommunications network of claim 5 wherein the at least one routing device is further configured to utilize the particular customer account number to access the one or more device identifiers stored in the database to match the received ANI value with the at least one of the one or more device identifiers.

7. The telecommunications network of claim 1 wherein the ANI value is included in a header portion of the received request to access the collaboration conferencing system.

8. The telecommunications network of claim 1 further comprising: a collaboration conferencing bridge in communication with the at least one routing device, wherein the at least one routing device is further configured to transmit a suggested status of the requester to the collaboration conferencing bridge, the suggested status comprising the assigned chairperson status of the requester.

9. The telecommunications network of claim 8 wherein the collaboration conferencing bridge registers the requester with the suggested status, the suggested status providing access to one or more features of a collaboration conference to the requester.

10. A method for operating a collaboration conferencing system of a telecommunications network, the method comprising:
   receiving one or more device identifiers from a subscriber to a collaboration conferencing system;
   associating the one or more device identifiers with a particular customer account number of the collaboration conferencing system;
   storing the one or more device identifiers with the particular customer account number in a database;
   receiving a request to access the collaboration conferencing system, the request comprising an Automatic Number Identification (ANI) value associated with an originating communication device of the subscriber to the collaboration conferencing system;
   comparing the received ANI value to the stored one or more device identifiers in the database; and
   assigning a chairperson status to a requester to a collaboration conference based at least on the ANI value from the request matching at least one of the one or more device identifiers in a database, wherein the chairperson status provides additional features for the collaboration conference as compared to a participant status in the collaboration conference.

11. The method of claim 10 wherein each of the one or more device identifiers received from the subscriber is associated with a communication device associated with the subscriber and in communication with the collaboration conferencing system.

12. The method of claim 10 further comprising: transmitting a request for an access code in response to receiving the request to access the collaboration conferencing system; and receiving the access code through the originating communication device.

13. The method of claim 12 further comprising: associate a dialed collaboration conferencing telephone number and the received access code with the particular customer account number of the collaboration conferencing system.

14. The method of claim 13 further comprising: utilizing the particular customer account number to access the one or more device identifiers stored in the database to match the received ANI value with the at least one of the one or more device identifiers.

15. The method of claim 10 further comprising: transmitting a suggested status of the requester to a collaboration conferencing bridge, the suggested status comprising the assigned chairperson status of the requester.

16. The method of claim 15 wherein the chairperson status provides access to one or more features of a collaboration conference to the requester.

17. A networking device comprising:
   at least one communication port for receiving a request to access a collaboration conferencing system of a telecommunications network, the request comprising an Automatic Number Identification (ANI) value associated with an originating communication device of a subscriber to a collaboration conferencing system;
   a processing device; and
   a computer-readable medium connected to the processing device configured to store information and instructions that, when executed by the processing device, performs the operations of:
   accessing a database comprising one or more device identifiers associated with a particular customer account number of the collaboration conferencing system, wherein the subscriber is associated with the particular customer account number;
   comparing the received ANI value to the stored one or more device identifiers in the database; and
   assigning a chairperson status to a requester to a collaboration conference based at least on the ANI value from the request matching at least one of the one or more device identifiers in a database, wherein the chairperson status provides additional features for the collaboration conference as compared to a participant status in the collaboration conference.

18. The networking device of claim 17 wherein the processing device further performs the operation of: transmitting a suggested status of the requester to a collaboration conferencing bridge, the suggested status comprising the assigned chairperson status of the requester.

19. The networking device of claim 18 wherein the suggested status provides access to one or more features of a collaboration conference to the requester.

* * * * *